Nov. 6, 1951  J. F. GILREATH  2,574,385
TRACTOR MOUNTED PULVERIZER AND ROLLER COMBINATION
Filed Sept. 2, 1948
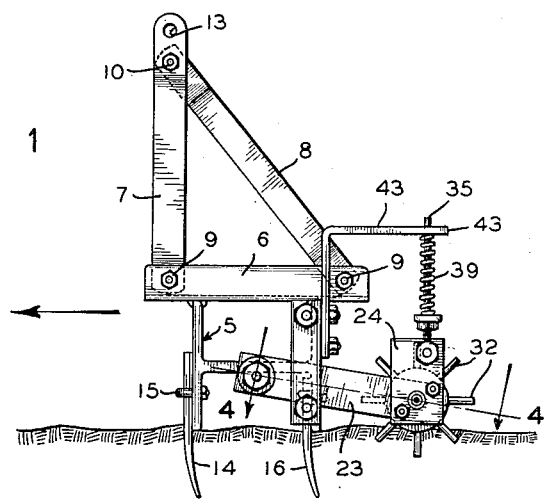
FIG. 1
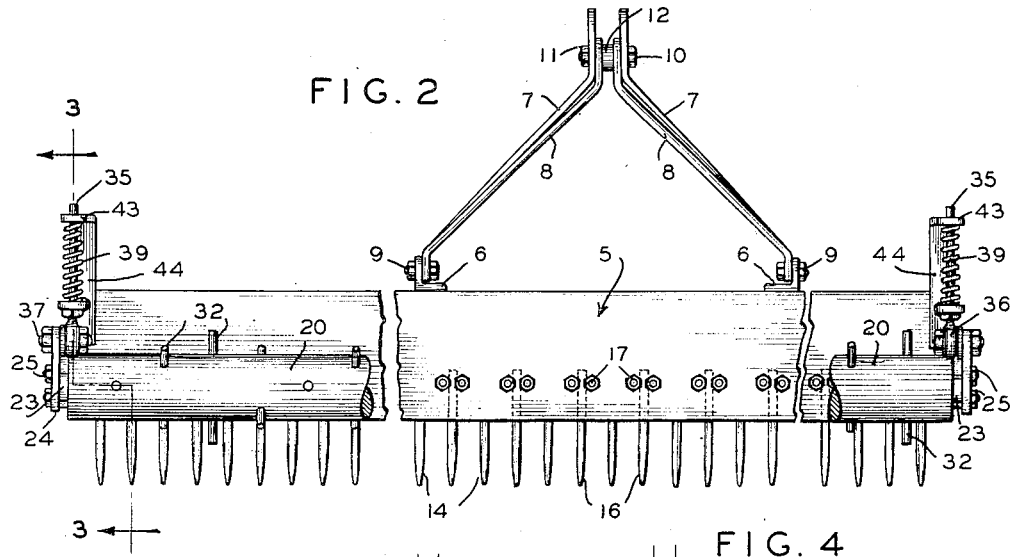
FIG. 2
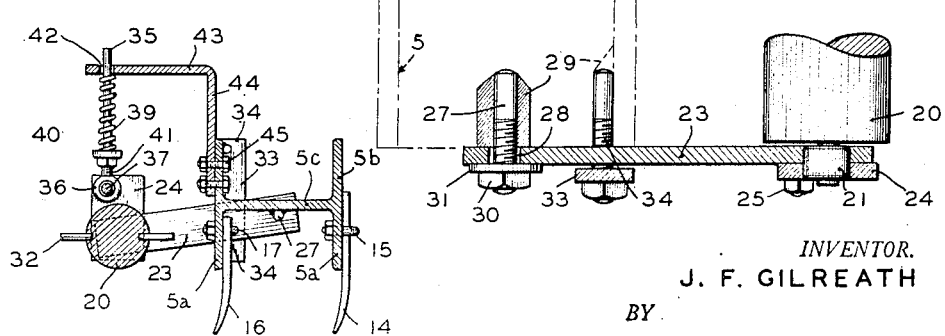
FIG. 3
FIG. 4
INVENTOR.
J. F. GILREATH
BY
A. Yates Dowell
ATTORNEY Patented Nov. 6, 1951

2,574,385

UNITED STATES PATENT OFFICE 2,574,385

TRACTOR MOUNTED PULVERIZER AND ROLLER COMBINATION

John F. Gilreath, Charlotte, N. C.

Application September 2, 1948, Serial No. 47,410

6 Claims. (Cl. 55—12)

This invention relates to apparatus for leveling and pulverizing the soil preparatory to the planting or sowing of grass and other crops.

At the present time, so far as is known there is no machine made that will act as a leveler or grader and also as a pulverizer for soils, preparing the same for the sowing or planting of grass seed, clover seed and the like. Farm machinery is too cumbersome and heavy and besides will roll over the top of large clods of earth, without breaking them up. Hand implements and methods will do the work, but only at a prohibitive cost in time and back-breaking labor, where large areas are involved.

The general object of the invention is to provide apparatus which may be drawn by a tractor or draft animals over a lawn, golf course or other area and will automatically level and pulverize the soil when so drawn.

Another object is to provide a soil pulverizer and leveler of simple, light weight construction.

Another object is to provide an exceedingly rigid and strong device of this character, which is easily manufactured, easily repaired and readily maintained in working condition.

A further object is to provide apparatus adding the weight of the soil to its own weight to enhance its pulverizing and leveling actions.

Another object is to provide apparatus which will apply adjustable pressure to the soil-breaking elements.

A further object is to provide a soil pulverizer which will break up clods of earth and not ride over them as certain prior art machines will do.

A further object is to arrange the soil-pulverizing teeth in such a way that roots, rocks and other obstructions will not snag the teeth or break them.

In the accompanying drawings forming a part of this specification:

Fig. 1 is a side elevation of an embodiment of the invention;

Fig. 2, a rear elevation (or view from the right side of Fig. 1) with parts broken away, the view being on a larger scale;

Fig. 3, a cross section on line 3—3 of Fig. 2; and

Fig. 4, a detail in section, on a still larger scale, being substantially on line 4—4 of Fig. 1.

With continued reference to the drawings, the preferred apparatus comprises a frame, a tractor hitching structure fixed to the frame, sets of soil-pulverizing teeth fixed to the frame, and an adjustable roller having teeth engaging the ground back of the frame and adapted to break up clods of dirt.

To obtain a maximum strength and rigidity, I prefer to employ an H-beam as the frame member, preferably an 8-inch H-beam six feet long. The H-beam 5 is adapted to perform a leveling or grading function as well as to serve as a frame, and has two of its flanges 5a in contact with the soil, the other two flanges 5b extending vertically above the horizontal web 5c. At the center of the beam a tractor hitch is secured. In its preferred form the hitch consists of two triangular frames brought together at their apexes but separated at their bottoms where they are fixed to the two upper edges of the upwardly extending flanges 5b. Each triangular frame consists of a base member 6, which is an angle welded to flanges 5b, and upwardly and inwardly slanting side members 7, 8 secured by bolts 9 at their lower ends to angle 6. The four sides 7, 8 are secured together at the apex by a bolt 10, nut 11 and sleeve 12 to form a very rigid, strong hitch consisting essentially of two united trusses. The two side members 7 project slightly above the apex and have aligned perforations 13 (Fig. 1) to permit coupling with the tractor. The two forward bolts 9 also permit coupling the hitch at two other points to the tractor. The described tractor hitch is particularly useful with a tractor which has a hydraulic hoist operating at the rear end and well adapted to lift and lower an implement such as the one described herein; but the hitch may be used with other tractors or may even be coupled back of a team of draft animals by known appliances.

Secured to the forward side of the forward flange 5a is a row of generally vertical teeth 14 made of spring steel, pointed at their lower ends and curved slightly to the rear. Each tooth 14 is fastened individually, so that it may be replaced if broken, a U-bolt 15 preferably being used for this purpose. These teeth are the first parts of the pulverizer and leveler to encounter the soil and obviously will perform a great deal of work and will be subjected to considerable wear and tear. The lower ends of teeth 14 project preferably about 4 inches below the bottom edge of flange 5a to which they are secured. The teeth may, of course, be adjusted up and down relative to the I-beam to vary the extent of penetration into the soil. This adjustment will usually be performed prior to starting work and will not ordinarily be changed until a different type of soil is encountered. The slight rearward curvature of the teeth is useful to preclude catching on roots and the like, the teeth ends being properly shaped to ride over obstructions.

Secured to the forward side of the rear flange 5a is a second row of upright teeth 16 which are exactly like teeth 14 except that they are shorter, their upper ends being beneath the web 5c. The teeth 16 in this second row are staggered relative to the teeth 14, as clearly shown in Fig. 2. Teeth 16 are individually secured as by U-bolts 17 but are not adjustable up and down to any material extent. The lower curved ends of teeth 16 project uniformly approximately 4 inches below the lower or ground-engaging edge of flange 5a to which they are secured. It will be appreciated that when an 8 inch H-beam is employed, as is preferred, the second row of teeth will be about 8 inches back of the first row. This arrangement, and the staggering, insures a breaking up of lumps of dirt and a sufficient pulverizing of the soil to condition it for the final rolling.

Pivotally mounted on the H-beam is a cylindrical roller 20 having anti-friction bearings 21 received in apertures 22 in the ends of arms 23. A pressure plate 24 is secured by studs 25 to each arm 23 and has an aperture 26 to receive the anti-friction bearings 21. Arms 23 are pivoted at their forward ends to the I-beam by means of bolts 27 passing through bores 28 in said arms, said bolts being welded as at 29 to the underside of the 5c. Nuts 30 and washers 31 (either of which may be self-locking) hold the arms 23 on the bolts. Thus roller 20 is free to swing about the common axis of the aligned bolts 27 at the opposite ends of the H-beam. Roller 20 preferably has straight teeth 32 fixed to and projecting radially outwardly from the cylindrical surface thereof, the function of these teeth being to break up any clods which may ride over the top of the I-beam or pass under the teeth. Teeth 32 preferably project about 1½ inches or 2 inches beyond the roller, which is preferably a straight 4-inch shaft. Preferably the teeth are not in straight rows lengthwise of the roller but are arranged in a series of spirals, as will be clear from Fig. 2. Vertical straps 33 provide guides for the pivoted arms 23. To secure the guide straps a pair of bolts 34 may pass through each strap and may be welded respectively to the upper and lower flanges 5b, 5a at the rear of the H-beam. This welding will be understood without illustration. The lower bolts 34 will act as stops to limit downward swinging of arms 23, hence lowering of the roller. This is desirable when lifting the apparatus, to prevent the pins 35 from moving out of apertures 42 at that time, and to prevent the heavy roller from swinging down against the rear teeth 16. If desired, the roller may be lifted without lifting the frame, which is desirable at times when trash, vines and other material need to be removed from the teeth on the roller.

While an arrangement of levers having adjustable weights could be used to cause the roller to press down on the soil, because of its light weight I prefer to employ the spring arrangement shown. To each pressure plate 24 a pin 35 is secured by means of its eye 36 and a bolt 37. A coil spring 39 is carried on pin 35 and a nut 40, threaded on screw threads 41, bears against the lower end of coil spring 39 to adjust its compression. The upper end of pin 35 passes loosely through an aperture 42 in a horizontal arm 43 of a right angled strap 44, the other arm of which is secured by bolts 45 to the rear flange 5b of the I-beam. The upper end of spring 39 engages the underside of arm 43. As nut 40 is screwed up to increase the compression of spring 39, the reaction will be transmitted through the pin 35 to the pressure plate 24; thence to the roller through its bearing, the roller thereby being thrust downwardly. The combined pressure of springs 39 may be 350 pounds or more, but will be varied to suit soil characteristics and conditions.

In operation the implement will be pulled or dragged over the surface of the plot of ground to be worked in the direction of the arrow shown in Fig. 1. If the soil has been properly prepared the teeth 14 and 16 will penetrate the soil to the maximum extent permitted by the construction, with the lower edges of flanges 5a in direct scraping contact with the ground. Some of the soil will be piled up in front of the forward side of the H-beam and from time to time the soil thus being pushed ahead of the H-beam will flow over the top of the beam and will at least partially fill the channel formed by web 5c and flanges 5b. The weight of the soil in the channel may be 100 pounds or more and this weight will enhance the ground-leveling action of the implement. The staggered rows of teeth will break up the soil into small lumps. Any clods not acted upon by the teeth 14 and 16 will be broken up by the toothed roller 20 which will continually revolve as the implement is pulled over the ground. If the operator observes that the roller is not breaking up the clods he will merely increase the spring pressure on the roller by turning the two nuts 40.

It will be obvious to those skilled in the art that various changes may be made in the described embodiment of the invention without departing from the spirit and scope of the invention. Hence the invention should not be considered as limited by that which is shown in the drawings and described in the specification but only as indicated in the appended claims.

What is claimed is:

1. Earthworking apparatus comprising a main frame having a transverse H-beam with the web positioned substantially parallel to the ground and the lower edges of the downwardly extending flanges in scraping contact with the earth, a plurality of teeth fixed to said flanges and extending downwardly therefrom for penetrating and breaking up the earth, arms extending rearwardly from said frame, and an elongated cylindrical transverse roller rotatably mounted on said arms in rolling contact with the earth.

2. Apparatus as set out in claim 1 wherein said arms are pivotally mounted on said frame.

3. Apparatus as set out in claim 1 wherein said arms are pivotally mounted on said frame, and resilient means are provided between said frame and said roller urging said roller downwardly.

4. Apparatus as set out in claim 1 wherein said arms are pivotally mounted on said frame, and adjustable resilient means are provided between said frame and said roller urging said roller downwardly.

5. Apparatus as set out in claim 1 wherein said teeth are curved rearwardly from said edge.

6. Apparatus as set out in claim 1 wherein said roller is provided with a plurality of short radial teeth for further breaking up the earth.

JOHN F. GILREATH.

REFERENCES CITED

The following references are of record in the file of this patent:

UNITED STATES PATENTS

| Number | Name | Date |
| --- | --- | --- |
| 212,722 | McNitt | Feb. 25, 1879 |
| 1,284,901 | Johnson | Nov. 12, 1918 |
| 1,545,564 | Krotz | July 14, 1925 |
| 1,814,469 | Finney | July 14, 1931 |
| 2,303,043 | Goodman | Nov. 24, 1942 |

FOREIGN PATENTS

| Number | Country | Date |
| --- | --- | --- |
| 559,336 | Great Britain | Aug. 9, 1943 |